(12) United States Patent
DeLorenzo (10) Patent No.: US 10,227,782 B2
(45) Date of Patent: Mar. 12, 2019

(54) PROCESS FOR PRODUCTION OF GLAZED, HIGH DENSITY ENGINEERED SURFACE PRODUCTS AND PRODUCTS THEREOF

(71) Applicant: Joseph F. DeLorenzo, Torrence, CA (US)

(72) Inventor: Joseph F. DeLorenzo, Torrence, CA (US)

(*) Notice: Subject to any disclaimer, the term of this patent is extended or adjusted under 35 U.S.C. 154(b) by 325 days.

(21) Appl. No.: 15/009,548

(22) Filed: Jan. 28, 2016

(65) Prior Publication Data

US 2016/0230396 A1     Aug. 11, 2016

Related U.S. Application Data

(60) Provisional application No. 62/113,286, filed on Feb. 6, 2015.

(51) Int. Cl.
| | |
|---|---|
| *E04F 13/08* | (2006.01) |
| *E04F 15/08* | (2006.01) |

(Continued)

(52) U.S. Cl.
CPC ........ *E04F 13/0871* (2013.01); *A47B 77/022* (2013.01); *C03C 8/14* (2013.01);
(Continued)

(58) Field of Classification Search
None
See application file for complete search history.

(56) References Cited

U.S. PATENT DOCUMENTS

| | | | | |
|---|---|---|---|---|
| 4,078,028 A | * | 3/1978 | Kishi | ...................... C04B 28/26 264/129 |
| 5,568,391 A | | 10/1996 | McKee | |

(Continued)

OTHER PUBLICATIONS

Shekh "Sanitary Ware for Peace and Comfort in Your Home" (http://www.aonehouse.com/blog/sanitary-ware-for-peace-and-comfort-in-your-home/) Dec. 2013. (Year: 2013).*

(Continued)

*Primary Examiner* — David Sample
(74) *Attorney, Agent, or Firm* — Jacques M. Dulin, Esq.; Innovation Law Group, Ltd.

(57) ABSTRACT

Pre-fabricated, custom pre-designed, high-density engineered solid surface products, including countertops and other architectural surfaces such as vertical wall surfaces and decorative panels and a method of manufacture of unitary custom-fit interior and exterior engineered solid surface products that are stain resistant, moisture impervious, UV resistant, acid resistant, dimensionally stable, abrasion and impact resistant, and are glazed to produce unique decorative and utilitarian surfaces in a wide range of colors and textures, including artistic, one-of-a-kind works. The glaze surface includes exterior vertical edges on countertops and back-splashes that are continuous with the top surface color and design. Optional flaming (open flame treatment or "flame painting") or texturing of the post-glazed surface produces in a wide range of finishes, including a leather-look finish for crazed glazes. The invention includes custom-glazed monolithic engineered solid surface products that do not require site cutting, as a result of the inventive process.

20 Claims, 9 Drawing Sheets
(8 of 9 Drawing Sheet(s) Filed in Color)

(51) Int. Cl.
*E04F 13/14* (2006.01)
*C04B 41/50* (2006.01)
*C04B 35/14* (2006.01)
*A47B 77/02* (2006.01)
*C03C 8/14* (2006.01)
*C03C 8/20* (2006.01)

(52) U.S. Cl.
CPC .............. *C03C 8/20* (2013.01); *C04B 35/14* (2013.01); *C04B 41/5022* (2013.01); *E04F 13/14* (2013.01); *E04F 15/08* (2013.01)

(56) References Cited

U.S. PATENT DOCUMENTS

| | | | |
|---|---|---|---|
| 7,550,106 B2 | 6/2009 | Toncelli et al. | |
| 2003/0124359 A1* | 7/2003 | Koga | C03C 14/006 428/432 |
| 2010/0266817 A1 | 10/2010 | Hirst | |

OTHER PUBLICATIONS

Leslie "Five Ugly Ducks and How to create a ceramic drip lamp" (http://deeplysouthernhome.com/2013/06/five-ugly-ducks-and-how-to-create.html) 2013.*

Hall, Janet, "Remodeling 101: Lava Stone Countertops", Remodelista.com, post dated Jan. 15, 2015, posted Jan. 20, 2015. Retrieved from the Internet on Mar. 15, 2016. URL: <https://web.archive.org/web/20150120033101/http://remodelista.com/posts/remodeling-101-lava-stone-countertops-pros-and-cons?>.

Hazelton, Ron, "How a Granite Countertop is Measured, Cut and Installed", RonHazleton.com/projects, Jul. 9, 2014. Retrieved from the Internet on Mar. 15, 2016. URL: <https://web.archive.org/web/20140709020914/http://www.ronhazleton.com/projects/how_to_put_in_a_granite_counter_top>.

Smith, Michael, "Pyrolave Glazed lavastone", YouTube, uploaded on Jun. 13, 2009. Retrieved from the Internet on Mar. 15, 2016. URL: <https://www.youtube.com/watch?v=dPR9ihSkXC4>.

Clacana, "most iridiscent effect", ceramic arts community, thread started by claclana, Mar. 2, 2012. Retrieved from the Internet on Mar. 15, 2016. URL: <http://community.ceramicartsdaily.org/topic/1959-most-iridiscent-effect/>.

Vichardy, "Thread: Overglazing ceraimic tiles—where do I start?", craftsforum.co.uk, Mar. 17, 2011. Retrieved from the Internet on Mar. 15, 2016. URL: <http://www.craftsforum.co.uk/showthread.php?55735-Overglazing-ceramic-tiles-where-do-I-start>.

Mallet, Sas, "Natural Lava Sauna", Pyrolave-Architecture.com, Dec. 1, 2014. Retrieved from the Internet on Mar. 15, 2016. URL: <https://web.archive.org/web/20141201134502/http://www.pyrolave-architecture.com/sauna>.

Hildenbrand, Kim, "Granite Kitchen Countertop", hgtv.com/remodel, Jan. 11, 2015. Retrieved from the Internet on Mar. 15, 2016. URL: <https://web.archive.org/web/20150111104758/http://www.hgtv.com/remodel/kitchen-remodel/granite-kitchen-countertop>.

Ranawat, PS, "Quartz, Quartzite & Silica Sand", psranawat.org, Jun. 18, 2012. Retrieved from the Internet on Mar. 15, 2016. URL: <https://web.archive.org/web/20120618103835/http://www.psranawat.org/non_metallic/quartz.htm>.

* cited by examiner

PROCESS FOR PRODUCTION OF GLAZED, HIGH DENSITY ENGINEERED SURFACE PRODUCTS AND PRODUCTS THEREOF

CROSS-REFERENCE TO RELATED APPLICATIONS

This is the US Regular Application of a US Provisional Application having the same title and filed by the same inventor on Feb. 6, 2015, Ser. No. 62/113,286, the benefit of the filing date of which is claimed under 35 USC 119 ff.

FIELD

This invention relates to the field of pre-fabricated, custom pre-designed, high density engineered solid surface products, including countertops, table tops, benchtops, worktops, back splashes, sinks, vanity tops, shower flooring, flooring and other architectural surfaces such as vertical wall surfaces and decorative panels. More specifically the invention relates to a method of manufacture of unitary custom-fit interior and exterior engineered solid surface products that are stain resistant, moisture impervious, UV resistant, acid resistant, dimensionally stable, abrasion and impact resistant, and may be glazed to produce unique decorative and utilitarian surfaces in a wide range of colors and textures, including artistic, one-of-a-kind works.

BACKGROUND

A wide range of high-density solid surface counter-top materials are available to home-owners, home remodelers, contractors and architects from among which to select, depending on use and decor needs. High density solid surface materials as referred-to herein are a class that excludes wood and the laminates such as Formica (Formica Group, NZ) and Wilsonart (ITW) and stainless steel, but includes natural materials such as marble, granite, soap stone, igneous lava-type materials such as basalt, and metamorphic materials such as slate, as well as man-made engineered slabs, such as cultured marble, concrete, quartz-containing slabs, vitreous ceramic tiles and glass or recycled glass, although there is a wide range of composition and density of those materials.

The current material of choice is natural granite because of its hardness and beautiful range of colors and natural patterns of its crystalline components and veining. It can also be diamond polished to a high gloss. However, granite is porous, prone to growing molds and staining. Thus, a granite surface requires a sealant that must be periodically re-applied.

The class of high density solid surface materials involved herein, also termed unitary or slab materials, are distinct from ceramic tiles in that they are self-supporting over large areas and are typically installed without backing mastic and grouted seams when used as horizontal surfaces such as kitchen counter-tops, tables, side-boards, shelving, sills and the like. Solid surface materials, depending on the size, may be installed on vertical surfaces using mastic, a silicone-based adhesive, or silica gel, the latter used in high temperature environments such as in the case of a fireplace surround, or by use of mechanical fasteners suitably engaging the slabs and the wall support elements.

There are currently two Categories (types) of commercially-available unitary solid surface, engineered materials: A. engineered materials employing a polymer matrix made in a low-temperature process, and B. high temperature-fired engineered materials involving vitrification, sintering, semi-sintering, or some degree of surface softening of component particulates to permit bonding into a relatively monolithic slab.

However, polymer matrix-bonded engineered materials of Category A are highly UV sensitive, resulting in their change of color and degrading over time when exposed to light. Thus, such materials are not recommended or warranted for exterior use, such as out-door cook-tops, tables, benches or vertical architectural panels. They also have a relatively low cut and abrasion resistance, and some may discolor when a hot pan is placed on the surface, that is, they will exhibit "burn" marks. While abrasion marks may be buffed out, cuts and gouges have to be filled with acrylic or polyester epoxy resins, then polished.

Non-exhaustive or inclusive examples of Category A materials include such well-known brands as Corian (DuPont), Caesarstone (Caesarstone Sdot-Yam, IL; Caesarstone Intl, US), Silestone (Cosentino, SA), Swanstone (Swan Co.), Staron (Samsung), Zodiaq (DuPont), Avonite (Aristech), Hanex (Hanwha Living & Creative, KR), Hi-MacsNiatera (LG Hausys, KR). These products comprise stone powder and/or granules retained in a plastic matrix, such an acrylic, polyester or polyurethane polymer, co-polymer or ter-polymer. Most include binders and colorants to provide monolithic color, so that cut edges have the same color throughout. One of the earliest materials was "cultured marble" comprising high strength polyester resin and real marble stone dust. Corian is the brand name of DuPont for a solid surface material made of an acrylic polymer and alumina trihydrate, derived from bauxite ore. Zodiaq, another DuPont product, is an engineered surface comprising 93% quartz crystal and 7% acrylic resin. Zodiaq is non-porous and does not require a sealant. The color of Zodiaq is uniform throughout. Silestone, an engineered quartz surface product made by Cosentino SA, is 94% quartz, 6% polymer matrix that includes a silver ion-providing component to retard the propagation of bacteria on the surface. Other materials in this class include: Bretonstone, Cambria, Viatera, Radianz, Technistone, Okite, Avanza, Compac, Vicostone, and Qortstone, all of which include quartz as the major inorganic component (80-95%) and are believed to be based on Breton's process covered by EP patent(s).

Non-exhaustive or inclusive examples of category B materials include Dekton (Cosentino, SA) and Lapitec (Breton, FR). Both are produced in a high temperature process. Lapitec is an inorganic ceramic material, sintered at about 1200° C. to produce "full body" (understood to mean monolithic) slabs. Dekton is a proprietary product involving densification of quartz particulates followed by semi-sintering with small amounts of flux to produce a fine-grained monolithic slab product. In both materials, there is a limited color palette based on inorganic colorant components mixed into the materials prior to firing resulting in uniform color throughout the thickness of the material. These Category B materials may be exposed to sunlight, such as out of doors or where exposed in interiors, without degradation.

Another current trend is production of large tiles or slab surfaces of vitreous ceramic, onto which surface decals are applied and fired. The decals currently mimic natural stone surfaces, typically marble, or images. However, the decal is a thin surface-feature only, which is revealed when an edge is cut. Thus, the fired surface design does not flow over onto an exposed edge, such as the front edge of a kitchen counter, or the revealed edge for an under-mounted sink. Although it is possible to fold a decal over the edge, the result is a face design or image that unnaturally flows over the edge.

Accordingly, there is an unmet need in this art for a true design break-out for permanent solid surface materials that are universal in use, both indoors and outdoors, has high strength, is non-porous, optionally may not require sealing, has design elements that flow over corners including complex shapes, does not require on-the job cutting for fitting sinks or faucets, can be custom pre-designed and shop prefabricated for on site installation with minimal cutting or fitting, is capable of being highly and artistically decorated during fabrication as an architectural and design element and is competitively priced with currently available solid surface materials.

THE INVENTION

Summary

The invention comprises a method for manufacture and installation of custom pre-designed, pre-cut and pre-glazed (or "stained"), solid surface products that are stain resistant, resistant to ordinary culinary acids, moisture impervious, UV resistant, dimensionally stable, abrasion and impact resistant, and have unique decorative and utilitarian surfaces features in a wide range of colors and textures, including artistic, one-of-a-kind works.

The inventive process includes preparing or selecting a high density surface material comprising in excess of 90-95% by weight quartz or equivalent high-silica material, having less than about 3% moisture and less than about 1% of an organic binder. The quartz is preferably high quality (natural impurities less than about 2%), crushed crystalline quartz material having a particulate size ranging from about −50 (grit) to +20 (particles) USS mesh. The quartz particulates are mixed with a minor amount of $Al_2O_3$ as a binder, typically less than 3%, and may also include less than about 1% $ZrO_2$ as a flux. No added colorants are required, but if a body color is desired, colorants may be added. A portion of the $Al_2O_3$ and silica material may be substituted by kaolinite in an amount of up to 10% of those components. All percentages are by weight.

The components may be mixed in the presence of a minor amount of water to produce a thick "paste" that is extruded as a wide, green slab several inches thick onto a drying belt. The extruded green slab is sized for most common finished uses, such as 36-48" width by 6'-10' in length for home surface applications, up to about 6'-8' in width and 40'-50' in length for commercial and architectural applications. Optionally, the extruded green slab may be subjected to vibratory compaction during the extrusion step. The green slab is then dried to reduce the water content to <1% to produce a "leather-hard" slab.

The leather-hard slab is then subjected to high pressure to reduce the thickness on the order of from about 10-25%, preferably at least 20%, which densifies the slab (producing a densified slab of a selected thickness). At this stage, surface press-texturing (embossing) may be imparted to the top and/or bottom surface of the slab by suitably-configured platens used in the press, by way of example, a wood grain or geometric pattern.

The pressure is removed and the selected-thickness, densified slab (body) is then fired at a temperature in the range of from about 1200° F. to about 2700° F. for a time sufficient to cause partial sintering of the quartz particulates to produce a finished, thickness-calibrated slab. In a subsequent post-firing stage, surface texturing may be imparted to the calibrated slab by machine finishing, such as grinding, polishing, abrading and the like. This post-firing machine-finishing of the calibrated slab is to be distinguished from the press-texturing of the leather hard slab. In the case of pre-firing surface press-texturing, post-firing machine-finishing is only selectively employed, for example to provide an additional, light abrasion or polishing effect to enhance the platen-textured surface. However, as described in more detail below, glazing of the press-textured surface is one of the important options of the inventive process.

In regard to the firing of the leather-hard slab body, complete melting of the particulates is neither desired or required. Glassification or vitrification is also to be avoided. Rather, the firing results in an ultra-dense body material that has excellent dimensional stability, having a Thermal Coefficient of Expansion within the range of $6.3 \times 10^{-6}$ to $8.1 \times 10^{-6}$ cm/° C. The particles may be characterized as surface welded to each other, with the cores of the larger particles retaining their crystalline structure, while the particulate-surface "softening or melt" is just sufficient to provide binding upon cooling, and to permit close packing re-arrangement of the fines in the interstices between larger particles. The result is a monolithic, high density, uniform product having a density on the order of 2.5 grams/cm$^3$. Upon breakage, the high density surface material has a uniform fracture surface, characterized as a smooth fine-grained fracture surface, generally conchoidal in nature, but not having a glassy surface. As such it is distinguishable from a conchoidal glass or obsidian fracture surface. After firing, the resulting base slab material may, but need not, be polished to preselected dimensional thickness or surface smoothness.

The finishing process steps proceed as follows, taking by way of example a custom kitchen counter top: Precise measurements are taken at a job site or drawn per specifications for the installation. For niche fitting (fitting in a niche at the job site, say a wall niche) and mitered corner joins, e.g., for a countertop that includes one or more sections that is/are orthogonal to a main run, approximately 1 mm is deducted to produce an "adjusted pattern". Where the installation is against a wall, the wall (longitudinal) edge should be gauged (profiled in plan view) to determine if it is straight, and if not, the raw slab is cut to match the gauged profile. The adjusted pattern is laid out on the slab and the slab is cut at a fabrication facility, e.g., by means of a diamond saw, water jet, or the like. The pattern cutting includes holes for the sink and the faucet, and any other purpose-dedicated holes, notches, relieved-areas and unique custom profiles. Where the fitting to an appliance requires precision clearance, the hole is enlarged from 1-2 mm. Thus, where an under-mount sink is to be installed, the hole is cut approximately 2 mm wider in both dimensions, width and length (depth, as distinguished from thickness).

The pre-glazed cut raw slab(s) may be taken to the job site for checking, or the as-cut dimensions checked against the pattern. The customer, contractor, architect, interior designer or artist selects a glaze or "stain" color, glaze type (oxidized or reduced), lustre (e.g., matte, gloss, crystalline, metallic), artistic design, texture, waterslide decal, pattern, or machined surface finish. As used herein the reference to "stain(s)" means the colorants used in the glaze composition to impart color. A wide range of stains and glazes may be obtained from commercial suppliers, such as Ferro Corp and Mason. The selected glaze(s) or stain(s) are applied to the upper surface and exposed edges (work or visible surface) of the pre-cut slab(s), which is/are then fired in an appropriate firing schedule. The glaze/stain is selected to fit the slab body so that the glaze/stain is subject to from zero to a suitably small amount of compression. The slab/body material has essentially zero shrinkage upon glaze/stain firing, so that the pre-cut dimensions are retained. Where a back-splash piece of the type that rests on the slab is used, the area of the slab under the back-splash bottom edge need not, but may be, glazed or stained.

It should be understood that the inventive process includes custom glaze finishing free-standing pieces, such as lavatory counter-tops that are free standing on bath vanities or pedestals. These free standing pieces may be made to standard dimensions, such as 36", 40", 48", 60", 72", 84", 96", etc., wide and standard depth of from 19"-30" deep. However, in accord with the invention, the holes for drop in or under-mount sink and faucets are cut in the monolithic base before glazing, and the front and side edges glazed, as well as the holes are glazed.

In contrast to the inventive process, if a slab is glazed prior to cutting-to-fit a particular job, the cutting would necessarily cut through the glaze, exposing the body beneath the glaze at the cut edges. The resulting cut glaze/body edge will result in glaze lifting or fracturing during the cutting process leaving a jagged edge where glaze crystals are loosened and removed during cutting. In addition, post-cutting of the glaze can result in large sections of glaze to lift or flake-off as a result of infiltration of moisture at the cut edge over time. In addition, in the inventive process, post-cutting glazing permits the glaze to continue down the front and end edges, and on select other edges, such as at the sink opening for an under-mount sink. Thus, in accord with the inventive process the glaze color and design will continue over the counter top front edge, regardless of whether it is simple vertical cut with an edge chamfer, a bull nose, an ogee, double ogee, or some custom profile.

The glaze is also selected and compounded so that there is minimal build-up, thickening, "drip", or runs on vertical surfaces, and minimal thinning or "pull back" at corners such that the underlying color of the body shows. Neither effect is desired at miter joins, as the varying thickness of build up will make for an ugly, irregular and difficult to seal seam, while thinning will outline the join; neither is desired. However, where a build-up or thinning effect is desired on an exposed front edge as a design element, or on a press-textured surface (such as a wood grain embossing) the glaze may be selected to provide the desired drip or pull-back effect, e.g., enhancing the grain pattern of a wood grain embossing, or enhancing a machine-polished crackle glaze by overglazing. Where there is also a miter join with a second slab at an angle, the abutting faces need not be glazed.

In addition to glazing and staining, an engobe or slip trail design may be applied. Likewise, an artist may "paint" a design or picture with glaze(s) or stain(s), resulting in a unique artistic decorative surface for a solid surface installation, such as a cocktail bar, table, vanity top, kitchen counter, backsplash, or other architectural surface. Appropriate additives are employed in the glaze composition in the case of brushing to prevent too-rapid drying of the glaze. Taking a café table by way of example, a glaze artist can glaze-paint for example, Vincent van Gogh's "Café Terrace at Night" scene onto the top surface. Indeed, each table may be a different scene.

It will also be appreciated that being glazed, the resulting custom surface is hard, heat resistant, abrasion resistant, impervious, resistant to typical culinary and household acids and alkalis. In addition the glazed surface is particularly resistant against UV fading, unlike acrylic polymer type solid surfaces. The rigid and very robust body material, having a thickness no more than the typical granite slab, and the strength to be self supporting, will not flex, preventing initiation of glaze flake-off.

The inventive process includes post-glazing surface texturing, such as diamond brushing of selected portions of the glazed surface to impart a "leather" look, to reveal crazes of the glaze for an antique effect, honing to reveal a contrasting or complementary underglaze, body or engobe color. In addition, a second over-glaze, such as a transparent over-glaze may be used to seal or add dimension to the surface of crackle, or diamond-brushed crackle glazes to produce a leather look and texture. Still further, high titanium glazes may be lightly torched or "flame brushed" to impart brilliant metallic rainbow effects, akin to oil sheen on water. The flame finish refracts light into a full spectrum of colors, reds, blues, greens, yellows, violets, magentas, blacks and the like. Thus, the designer or artist effectively "paints with flame" to produce a highly unique, custom artistic piece on the large monolithic solid surface products of this invention. Such pieces are primarily suitable as architectural wall or horizontal surfaces but may be used as contact and support surfaces, such as bar tops, side board tops, café-table tops and the like.

After shop-finishing as described above, the finished, glazed piece is transported to the work-site for installation. Because of the body stability upon glaze firing, the pre-glazing-cut-to-dimension is well within tolerances for the installation and fitting of appropriate appliances, in the case of the exemplary countertop, the sink(s), faucets, and sprayers. The result is a custom countertop that does not require any substantial cut-to-fit-work on the job-site.

Accordingly, the invention opens the door for an incredible range of artistic design and creativity that can be applied to large solid surfaces on a piece-by-piece, truly custom basis, to satisfy the requirements of discerning home owners and commercial establishments requiring architecturally and artistically unique surfaces. The glazed large solid surfaces of this invention do not have the disadvantageous distractions of grid-works of grout lines evident when using small glazed tiles, nor the upkeep of the grout, yet has all the advantages of the highest quality porcelain. In addition, unlike mass-produced surfaces wherein the customer has only a limited range of selected colors and granulation types, the inventive process and glazed products are one of a kind, unique and bring an artistic dimension into the field of large architectural solid surfaces.

BRIEF DESCRIPTION OF THE DRAWINGS

The invention is described in more detail with reference to the accompanying drawings and photographic illustrations. The patent or application file contains at least one drawing executed in color. Copies of this patent or patent application publication with color drawing(s) will be provided by the Office upon request and payment of the necessary fee.

DETAILED DESCRIPTION OF THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention.

Figure 1:
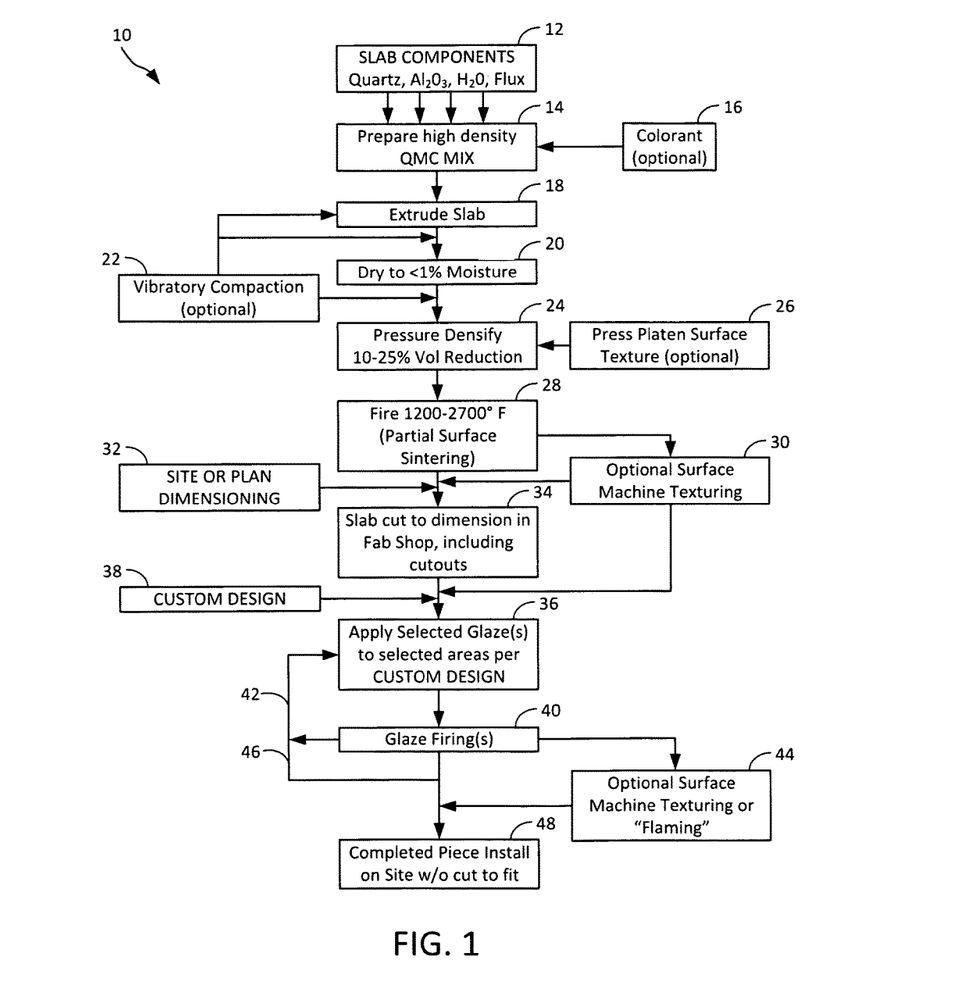
FIG. 1 is a flow sheet outlining the steps of the inventive process.

FIG. 1 shows the steps of the invention in flow-sheet format. The inventive process 10 begins with production of the body in the form of a slab. It begins with selection and weighing out of the components 12, preparing a damp or wet mix 14, and where a body color is desired, a colorant such as a stain or oxide, is added at 16. A body slab is extruded that is up to about 20% oversize (as compared to finished slab dimensions, to compensate for water content and size reduction due to compression to densify) at 18. The rough damp slab is dried to less than about 1% moisture by weight at 20. Optionally, during one or more of the extrusion and drying steps, vibratory compaction at 22 may be employed. The resulting leather-hard slab is then densified by compression under pressure sufficient to result in a 10-25% volume reduction at 24. During the densification step 26, a surface texture optionally may be imparted to the upper and/or lower surfaces of the slab in a platen or roller press, at 26. The densified, dried slab is then fired at 28 in the range of from about 1200-2700° F. for a time sufficient to provide a partial surface sintering of the mix particles to each other. After firing the slab is cooled and is now a gauged (thickness), fired undecorated slab. Optionally, one or more of the surfaces may be machine textured at 30, which can also serve to provide a precise dimensional thickness to the slab, e.g., 3 cm for countertops and to provide a custom edge contour. The fired body slab 28/30 may be stored for inventory, or moved on to the next phase of processing.

In the next phase, site or plan-based dimensions are developed at 32 for a unique custom job. The gauged, fired body slab 28/30 is then cut to dimension at 34 in a fabrication shop, including cut-outs and dimensional allowances for exposed glazed surfaces, e.g., outer exposed edges, and cut-out edges for under-mount sinks and the like. The optional machine texturing 30 of selected surfaces or edges may be done at this stage as well. Then one or more selected glaze compositions is/are applied to selected areas 36, in accord with a custom design 38. The glaze is fired at 40 pursuant to a firing schedule appropriate for the slab body and glaze composition. As shown at optional steps 42, 44 and 46, a second glaze may be applied and fired, including after an intermediary surface texturing by machine or "flaming" at 44. An example is diamond brushing of a crackle glaze laid down and fired at steps 36 and 40 to produce a leather texture look, optionally followed by a thin clear over-glaze at 46 to seal the expose crackle grooves produced by the diamond brushing. The completed piece 48 is then installed at the site without the necessity of cut-to-fit, since the glaze firing did not result in slab shrinkage.

Example 1

A gauged, fired slab having the dimensions of 3 cm thick, by 130" long and 58" wide is selected for a kitchen countertop. The job site is measured, a template created and the slab is cut in the fab shop to the job-site measure, including cut-outs for under mount sink, faucet water supply and sprayer holes, and an angular (45°) join-cut for a counter L-section (which backs against a side wall). In addition, a double ogee pattern is machined on the outside front edge. The sink cut-out is over-sized since glaze will cover the vertical edge, the sink chosen being an under-mount sink. The counter L-section slab is cut per the required measure, including a matching join-cut, double ogee on the exposed front and end edges, and a cut-out for a drop-in range top. A third strip, 6" high by 120" long, is cut for a backsplash of the sink section. The top edge of the countertop slab cut-out for the sink is chamfered so the sink cut-out edge is rounded. Optionally, that vertical edge may be machined to form a desired ogee curved surface. In the case of an exposed island that mates orthogonally to the sink counter section, the respective join areas of the sink counter and island are left with a vertical, matching cut, and neither chamfered at their top edges nor machined with an ogee shape. However, the other three exposed 3 side edges of the island are ogee machined.

A glaze, such as one below, is applied to the sink section, L-section and/or island sections, and then fired at an appropriate cone for a suitable time, such as cone 06 for 8 hours. The backsplash has applied to it a glaze of different composition and color per the designer's specification. This backsplash glaze produces fine crazing. The glazed pieces are compared to the pattern and found to not have expanded or shrunk out of tolerance. Since the sink is an undermount, the vertical edges of the sink cut-out are glazed, as are all exposed ogee front and end edge surface(s). The undersides of the slabs are not glazed, nor are the matching mitered surfaces or the bottom edge of the back-splash. A strip along the back edge of the sink section is not glazed where the back-splash section is to be glued. In this example, per specifications, the backsplash is diamond brushed after glaze firing to provide a leather look that also reveals the fine crazing as part of the artistic appeal. Join edges may be cleaned-up by machining to insure a tight, true joint. The finished pieces are installed at the job site using an epoxy glue containing a dye matching the glaze color.

The following are exemplary glaze formulations that may be used with inventive gauged. fired slabs as described above:

TABLE I

Exemplary Glaze Recipies

| | Grams |
|---|---|
| A. Underglaze Base (engobe) | |
| Ferro Frit 3269 | 105 |
| Ball Clay (OM4) | 105 |
| Boric Acid | 7.5 |
| Bentonite | 7.5 |
| B. Matte Base Glaze | |
| Ferro Frit 3134 | 50 |
| 6 Tile Clay | 20 |
| Silica 30 | 30 |
| Tin Oxide | 1 |
| Zircopax | 10 |
| C. Gloss Glaze | |
| Lithium Carbonate | 8 |
| Whiting | 11 |
| Ferro Frit 3269 | 46.4 |
| Kaolin | 21 |
| Silica | 13.6 |
| D. Red Glaze | |
| Ferro Frit 3134 | 45 |
| Lithium Carbonate | 8 |
| Edgar Plastic Kaolin | 17 |
| Silica | 30 |
| Tin Oxide | 1 |
| Titanium Oxide | 2 |
| Copper Carbonate | 0.4 |
| Granular Rutile | 1 |
| E. Matte Turquoise Glaze | |
| Barium Carbonate | 10 |
| Borax Frit | 45 |
| Potash Feldspar | 15 |
| Ball Clay | 15 |
| China Clay | 15 |
| Copper Carbonate | 3 |
| F. Clear Crystalline Glaze | |
| Ferro Frit #3269 | 91 |
| Bentonite | 4 |
| Lithium Carbonate | 5 |
| Cryolite | 1 |
| G. Metallic Gold Glaze | |
| Black Copper Oxide | 4 |
| Cobalt Oxide | 2.5 |
| Manganese Dioxide | 36.5 |
| High Iron Red Clay* | 49 |
| *7% $Fe_2O_3$, 65% $SiO_2$, 15.5% $Al_2O_3$, 4.1% $K_2O$, and ~3.5% Ca, Mg, Na, P and Ti oxides. | |
| Ball Clay | 4 |
| Silica | 4 |
| H. Flame-Treatable Glaze | |
| Borax | 4.63 |
| Ferro Frit 3124 | 9.26 |
| Nepheline Seyenite | 24.07 |
| Kaolin | 15.74 |
| Ball Clay | 23.15 |
| Silica | 23.15 |
| Titanium Dioxide | 9.26 |

Glaze F is a clear crystalline glaze with mild crazing and can be colored with a wide rage of conventional stains and oxide colorants. For example, FIG. 10 (Example 10) uses this glaze with a Mason black stain #6657 for colorant. Optionally, this glaze can include up to about 5% of a flux or glass former such as Boron Oxide (e.g. as Boron Trioxide $B_2O_3$), $K_2O$, $Na_2O$, $Li_2O$, and the like, for greater visual depth to the crackle, possibly due to increased refractive index. It is particularly suited for post-firing machine texturing, e.g., by diamond polishing or brushing at step 44 of FIG. 1, to produce a leather-look textured finish as described above in Example 1 for the backsplash piece. If desired, crazed glazes can be overglazed or sealed with standard sealants, such as are used for granite counter-tops.

Examples 2-11

Examples 2-11 are photographic illustrations of exemplary monolithic slabs that have been glazed in accord with the process described above as illustrated in the FIG. 1 process flow-sheet, several showing post-glazing treatment, such as texturing and flaming.

Figure 2:
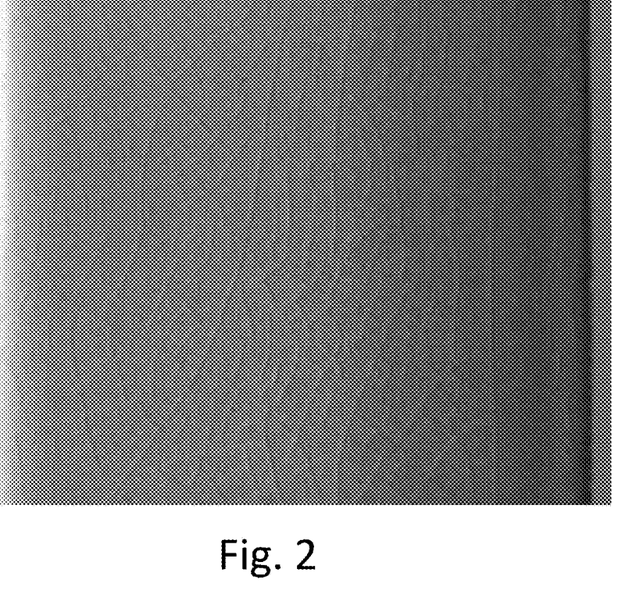
FIG. 2 is a photographic illustration, in color, of one of the products of the inventive process illustrating the feature of a front edge of a countertop slab on which a blue-grey crackle glaze has been applied and fired.

FIG. 2 (Example 2) shows by way of example, the front edge of a slab that has been glazed with a blue-grey crackle glaze. Note the crackle effect can be seen extending continuously over the chamfer intersection of the top face with the front edge (due to the lighting, the chamfer appears paler than the face on the left side). Although shown vertically in the figure to permit enlargement to better see the crackle effect, the typical orientation is rotated 90° clockwise, with the rounded edge up.

Figure 3:
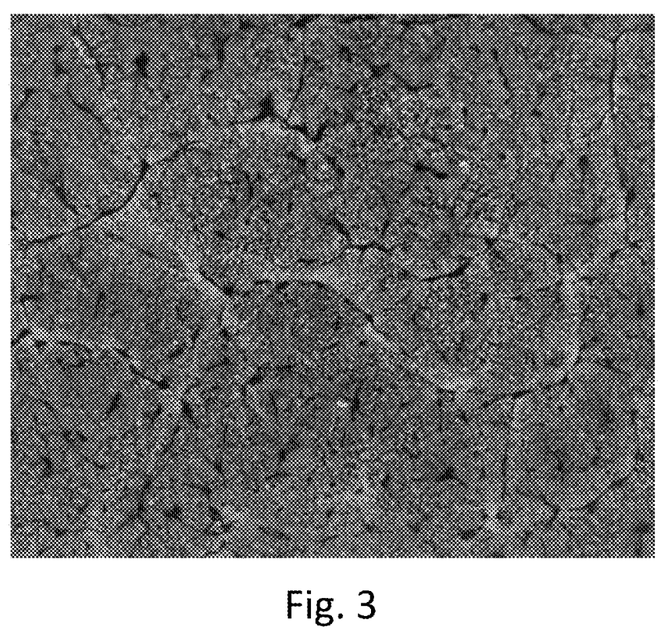
FIG. 3 is a photographic illustration, in color, of a multi-color "Blue Nebula" glaze applied and fired on a slab produced by the inventive process.

FIG. 3 (Example 3) shows by way of example, a close-up of a mottled, thick blue glaze showing undertones of lighter and darker blue in a design called "Blue Nebula". This glaze is a semi-matte glaze shown on a table top, counter top, vanity top or architectural design slab in accord with the present invention.

Figure 4A:
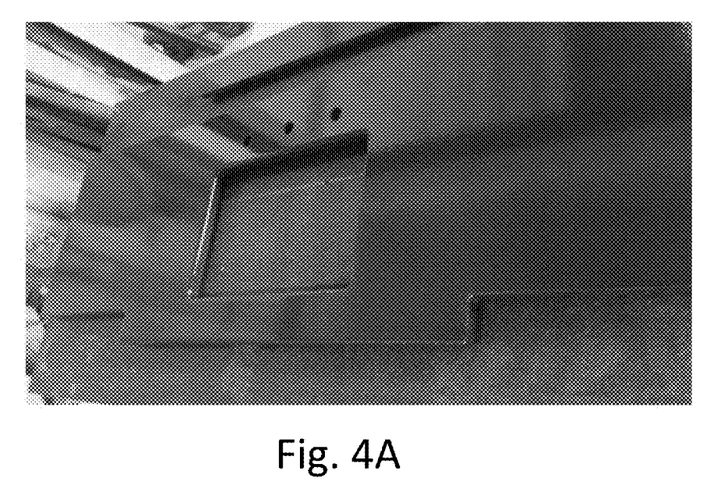
FIG. 4A is a photographic illustration, in color, of a complex pre-cut slab on which a red glaze has been applied and fired.
Figure 4B:
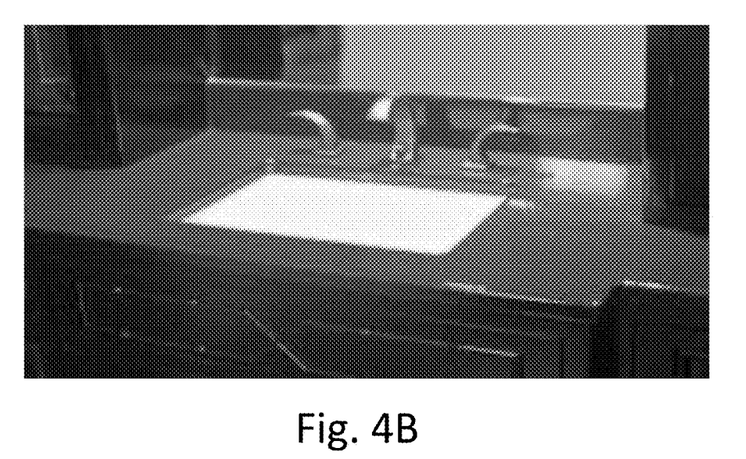
FIG. 4B is a photographic illustration, in color, of the pre-cut, pre-glazed slab of FIG. 4A as installed on a job site.

FIGS. 4A and B (Example 4) illustrate the significant continuity feature of the inventive process and slabs produced thereby. FIG. 4A shows a large (72" long), one piece, monolithic slab that has been cut pursuant to job site measure or design measure for a vanity and glazed with a red gloss glaze having a subtle orange peel texture. Note that the front edge of the slab as well as the square, under-mount sink cut-out edges and the faucet holes all have glaze that is a continuation of the top surface, making the as-glazed product consistent and uniform. In addition, the radiused edges where the top surface meets the vertical surfaces have continuity of look, color and texture. A backsplash section is seen in the center background. FIG. 4B illustrates the as-fired red vanity top of FIG. 4A as installed on site without need for further cutting, as there has been stability of dimension during the glazing and firing process steps. Note the vanity top fits from side-wall to side-wall, and the back splash precisely fits in the gap between the side cabinets without need for filler or trim strips.

Figure 5A:
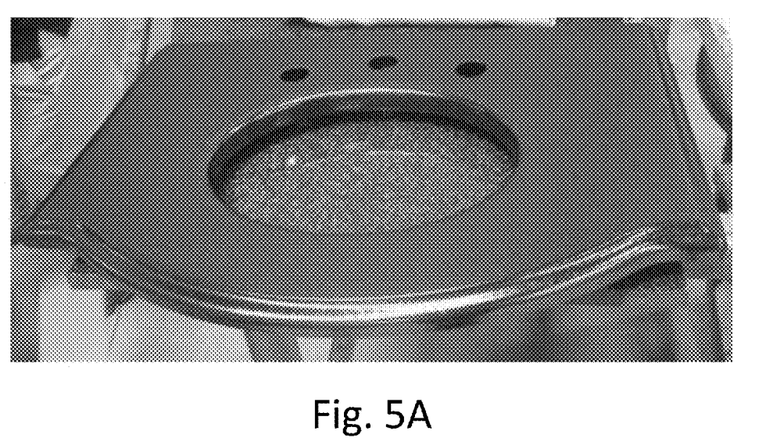
FIG. 5A is a photographic illustration, in color, of a complex pre-cut slab on which a gold metallic glaze has been applied and fired.
Figure 5B:
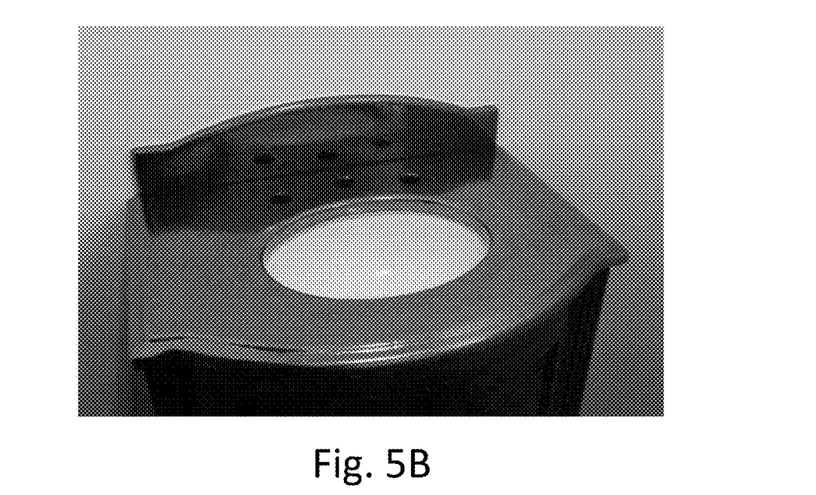
FIG. 5B is a photographic illustration, in color, of the pre-cut, pre-glazed slab of FIG. 5A as installed on a bath vanity.

FIGS. 5A and B (Example 5) illustrate a dark-gold-colored metallic luster glaze of the Formula G, above, applied to a black monolithic slab of the composition described above. This example produces a unique slab for horizontal use, such as a countertop, dining tabletop, café table top, or other architectural surface. As shown, it is used as a top for a free-standing bath or powder-room vanity having an oval cut-out for an under-mount sink, and includes a back-splash section having a curved to edge. Note the front and side edges of the vanity top are complex ogee shapes, and the glaze is smoothly continuous over these edges, as well as the vertical edge for the sink and faucet cut-outs. FIG. 5B illustrates the dark-gold metallic glazed top and back splash pieces of FIG. 5A as installed on a free-standing bathroom vanity cabinet. Note that the sink is a white ceramic porcelain under-mount type sink which clearly reveals the continuity of the sink cut-out side wall color, texture and look with that of the top and back-splash surfaces.

Figure 6:
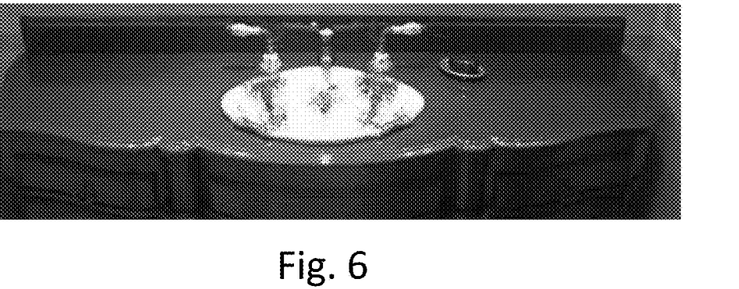
FIG. 6 is a photographic illustration, in color, of a complex pre-cut slab on which a gloss blue glaze has been applied and fired, an as shown installed.

FIG. 6 (Example 6) illustrates a large, high gloss, very vibrant blue, glaze applied over a white monolithic base slab, again showing continuity of the glaze over a complex, scalloped and ogeed facing edge. The property and feature of "continuity" as used herein includes not only the plane of a facing edge, but also that the edge contours joining "top" and "facing edge" surfaces, be they simple bevel or rounding, ogee (as shown) and the like, are continuously covered with the glaze, giving a unitary color, texture and finish look to all exposed surfaces. In this example, the sink is a drop-in decorated ceramic porcelain sink, and the finished inventive surface product is mounted on a vanity cabinet with a matching back-splash section.

Figure 7:
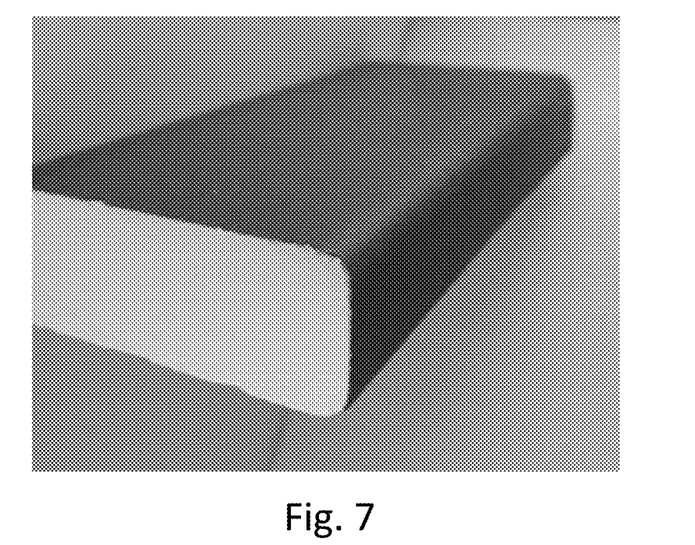
FIG. 7 is a photographic illustration, in color, of a blue-glazed back-splash slab that has been cut in vertical section to show the base slab and glaze wrapping from the face over the top edge contour.

FIG. 7 (Example 7) illustrates a blue-glazed back splash piece that has been specially cut to reveal the relative thickness of the body slab (in this example, 2" thick) and the glaze (in this example, on the order of 1 mm in thickness). The orientation of the back-splash in this figure has been rotated 90° clockwise from the normal back-splash orientation in order to permit an enlarged view to be shown. In this orientation, FIG. 7 also illustrates that the front edge of a countertop would have continuous glazing. As seen, the body is a fine grained, white, very dense high quartz-containing fired body that has excellent strength and dimensional stability when glazed fired. Thus, and as shown below in FIG. 8 the inventive slabs can be precisely cut to dimension before glazing, and the glazing step does not alter dimensions so that the final product may be directly installed without the need of cutting to re-dimension to fit the job-site space.

Figure 8:
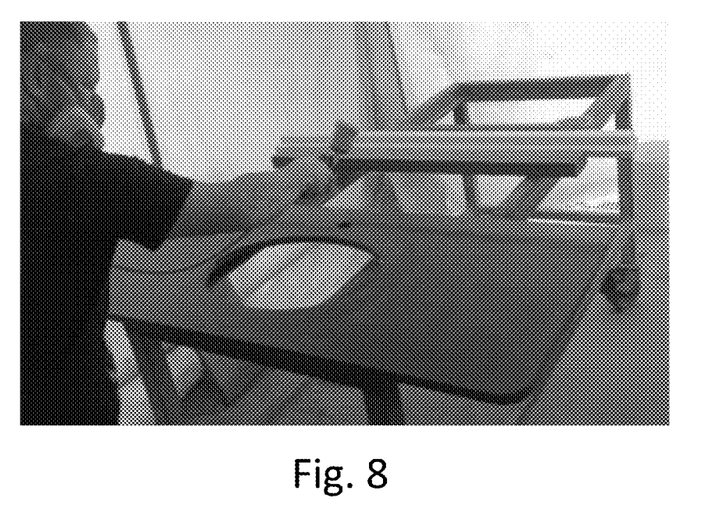
FIG. 8 is a photographic illustration, in color, showing a pre-cut vanity slab being spray-coated with a glaze composition.

FIG. 8 (Example 8) illustrates a pre-cut 2" thick slab (as shown the body material is black) having glaze applied, in this example, by spraying. Note the sink and faucet cut-outs have been made prior to glazing, the corners rounded and top outside edges chamfered. The glaze will be applied on the visible horizontal and vertical surfaces. A back splash piece is shown in the background.

Figure 9:
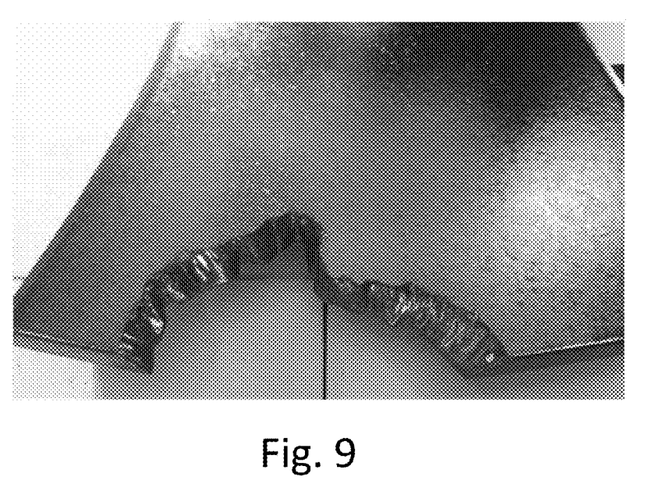
FIG. 9 is a photographic illustration, in color, showing a table top slab having a complex, artistic cut-away edge, and a silver-black glaze, having crystalline inclusions, continuously coating the top and vertical edges.

FIG. 9 (Example 9) illustrates a glaze that is black with metallic silver highlights and crystalline areas applied to a table top. Note the facing edge has a complex artistic, relieved, notched and grooved edge shape and the glaze is continuous from the top surface, over the edge and down the facing edges.

Figure 10:
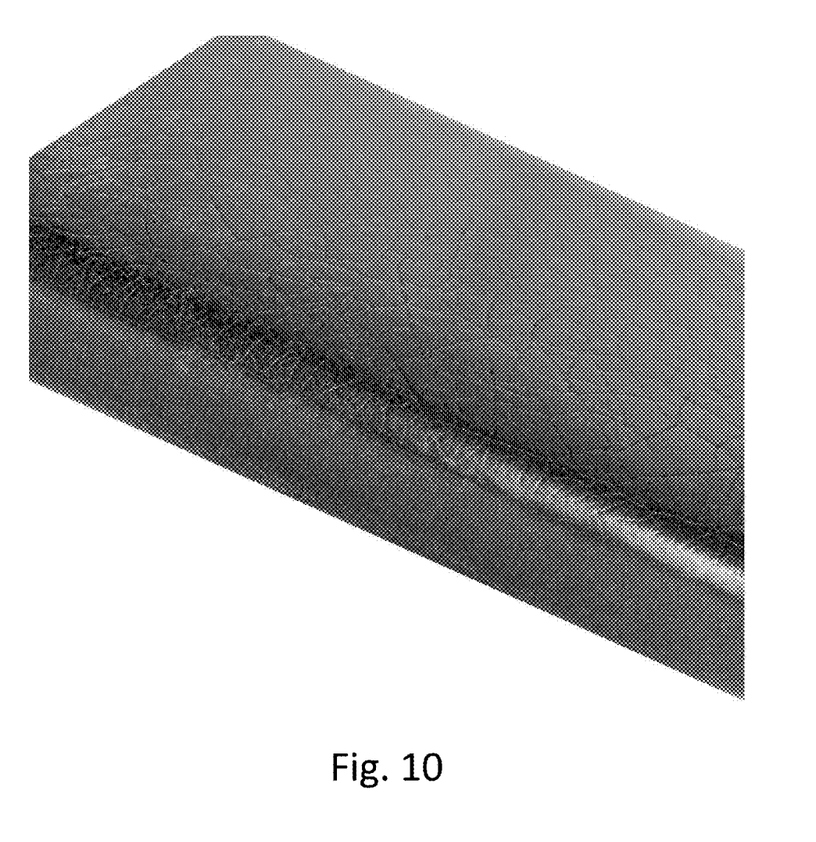
FIG. 10 is a photographic illustration, in color, showing the post-glazing texturing to produce a leather look.

FIG. 10 (Example 10) illustrates a crackle glaze over an engobe on an inventive slab which, after glaze firing has been surface treated (post glaze-firing treatment) with a diamond brush to reveal the crackle lines and provide a leather-look texture. The diamond brushing textures the surface more deeply along the crackle lines to provide a unique texture. The color, texture, luster and look are continuous over the facing edge. This look, luster, and texture cannot be produced by a platen press, particularly over a rounded edge, nor simultaneously on an adjoining vertical surface. In addition, in contrast to a platen texture, which must be a repeating design, the inventive textures are random properties of the glaze applied to the body.

Figure 11:
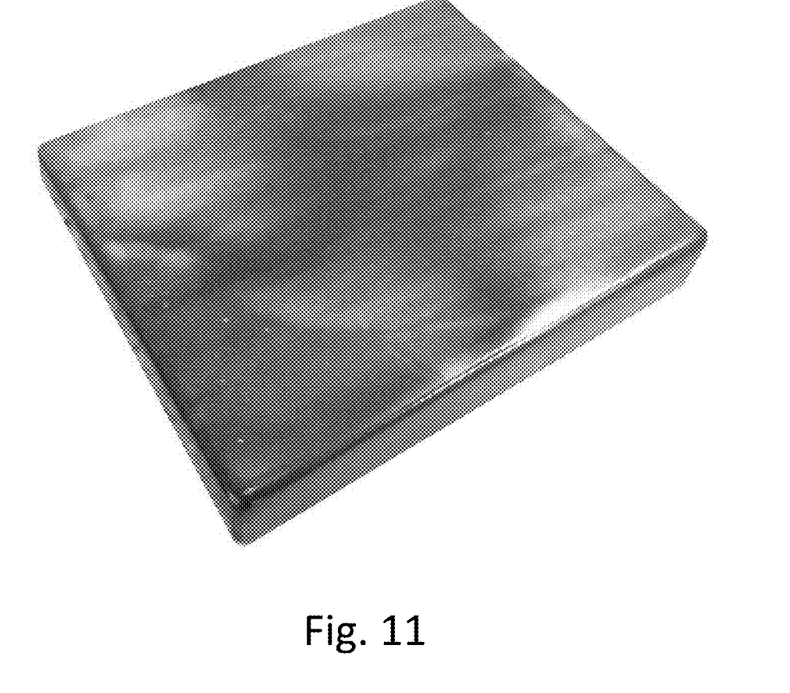
FIG. 11 is a photographic illustration, in color, showing a glazed café table slab that has been flame-treated, post glaze-firing, to produce an iridescent metallic look.

FIG. 11 (Example 11) illustrates a metallic glaze applied to a café table slab (on the order of 24" square), after which the glaze surface on top and facing side edges are treated by passing an open flame (e.g., propane torch) at varying distances and duration to produce a unique, one of a kind iridescent color palette to the piece. In essence, an artist paints with flame on the glazed surface of the piece to produce a highly artistic surface slab, which may be used as an architectural design element or as a utilitarian surface.

The examples given above show that the inventive fired monolithic high-density slab that has been glazed have a uniquely custom look, texture and color palette. The glaze top surface layer is on the order of between from about 0.5 mm to about 3 mm in thickness, and is acid resistant, abrasion and impact resistant, and color-fast, permitting external uses in areas exposed to solar radiation without fading or degradation. The glaze layer provides an added layer of weather and use resistance to the base slab material.

It is also important to note that the unique glaze texture and artistic look of the inventive surface slabs may be applied and fired to be continuous from a top surface over the front facing edge of a horizontal slab. This is in contrast to a slab having a pressed top surface, as a result of which the design and texture does not continue over the front edge, essentially distracting from or ruining the effect of surface relief produced by platen presses. Likewise, the application of a decal to the upper surface of a slab would not result in an over-the-edge design and texture continuity. In platen press surface relief or decal applications, the front edge would be a saw cut, requiring polishing, but having a different, non-continuous look, essentially an unfinished front edge. The brilliance, depth and unique look of the inventive slab surfaces cannot be achieved in an unglazed monolithic slab alone, not only top surface but also exposed edges, nor the range of palette choices and continuity of color, design, texture and depth.

Thus, with respect to the look of the finished slabs, the fired-glaze surface has a wide range of colors, the palette of which far exceeds current products, and may be produced with one or more of metallic, crazed, crystalline, gloss, matte, semi-gloss, eggshell, orange-peel, and satin looks, and post-treated for leather-like and iridescent looks and textures. The first, base glaze, may be overglazed with a second (or more) glaze(s) to provide at least one of artistic effect, surface sealing, enhanced visual depth, or enhanced surface hardening, abrasion resistance, impact resistance and acid resistance.

INDUSTRIAL APPLICABILITY

It is clear that the inventive process and products of this application has wide applicability to the construction and interior design fields, namely to bringing custom design, including a full range of artistic and design creativity to large slab surfaces. The method clearly permits rapid production of unique, one of a kind surface pieces, such as countertops, tables, wall surfaces and the like on an economical basis, as the slab bodies are uniquely custom decorated and fired after being cut to measure, rather than the customer (homeowner, business owner, architect, interior designer, etc.) being limited to a narrow range of granular surface "looks" of engineered surface materials. The range of applications, including to the exterior, rather than being confined only to interior sun-shaded areas, is much broadened. In addition, the inventive products have no less stability, stain resistance, impermeability and scratch resistance utility than those of expensive stone products.

Thus, the inventive process and products have the clear potential of becoming adopted as the new standard for artistic custom home, office, hotel and commercial space surfaces.

It should be understood that various modifications within the scope of this invention can be made by one of ordinary skill in the art without departing from the spirit thereof and without undue experimentation. For example, the glazed surfaces can have a wide range of artistic designs, yet retain the functionalities disclosed herein. Likewise, as needed, additional layers of glaze may be applied to fill in for over-cutting errors without having to junk the base slab. Optionally, minor honing or hole cutting may be done as needed, at the time of or pre-installation, to provide precise fitting. This invention is therefore to be defined by the scope of the appended claims as broadly as the prior art will permit, and in view of the specification if need be, including a full range of current and future equivalents thereof.

Parts List (This Parts List is provided as an aid to Examination and may be canceled upon allowance)

10 Inventive Process
12 Selection, weighing out components
14 Dry or wet mix
16 Colorant optionally added
18 Dense slab extruded
20 Drying extruded, densified slab
22 Vibratory compaction (optional)
24 Pressure applied - reduces volume and increase density
26 Platen press to texture surface
28 Fire dry slab
30 Optional machine texturing
32 Site or plan dimensioning
34 Cutting slab to dimensions
36 Glaze applied
38 Custom design to be applied
40 Glaze firing
42 Optional overglaze
44 Optional surface texturing or flaming of glaze
46 Optional overglaze after texturing
48 Completed piece installed
50
52
54
56
58
60
62
64
66
68
70
72
74
76
78
80
82
84
86
88
90
92
94
96
98
100
102
104
106
108
110
112
114
116
118
120
122
124
126
128
130
132
134
136
138
140
142
144
146
148
150
152

The invention claimed is:

1. A process for producing a custom unitary surface product comprising the steps of:
   a) providing a dimensional template for a finished unitary surface product having accurate dimensions for installation of a finished glazed surface product at a unique job site;
   b) providing a fired monolithic slab formed of a high silica composition having in excess of 90% by weight $SiO_2$, that is oversized as compared to said dimensions;
   c) cutting said monolithic slab to said dimensions to produce a custom cut slab;
   d) selecting and applying at least one glaze composition to preselected surfaces of said custom cut slab which are to be exposed to view;
   e) firing said glaze composition to produce a fired glazed surface product having a unique surface color, texture and look, and said fired glazed surface has continuity over said exposed surfaces including transitions from horizontal to vertical exposed surfaces; and
   f) installing said fired glazed surface product at said unique job site with said exposed surfaces showing, and without the need for additional edge finishing.

2. A process as in claim 1, wherein said template is selected from a job site measure, a take-off from an architectural or interior design drawing or representation, and a combination thereof.

3. A process as in claim 1 wherein said step of applying said at least one glaze composition includes creating an artistic design employing a plurality of selected different glaze compositions.

4. A process as in claim 1 which includes applying a post-firing treatment step to said fired glazed surface selected from at least one step of over-glazing, machine finishing and flaming.

5. A process as in claim 4 wherein said fired glaze surface is a controlled crackle glaze, and said surface treatment machine finishing includes diamond brushing to produce a leather-like finish.

6. A process as in claim 4 wherein said post-firing step of flaming includes applying an open flame to selected areas of said fired glazed surface for a time sufficient to produce an iridescent finish.

7. A process as in claim 1 which includes applying a second, over-glaze to selected areas of said fired glazed surface to provide at least one of artistic effect, surface sealing, enhanced visual depth, or enhanced surface hardening, abrasion resistance, impact resistance and acid resistance.

8. A process as in claim 1 wherein said monolithic slab is processed to include on selected areas of said slab, at least one of an engobe coating, a surface texture, and a top surface relief.

9. A process as in claim 1 wherein said at least one glaze composition is compounded to provide an effect selected from a controlled pull-back or drip to enhance artistic appearance.

10. A process as in claim 1 wherein said custom cut slab is a main surface portion and said installation step includes orienting and gluing separate glazed slab pieces to said main surface portion to join them together along unglazed areas of both said main surface portion and said pieces.

11. A custom monolithic, decorative and utilitarian surface product for interior and exterior architectural and construction installations, comprising in operative combination:
   a) a base monolithic slab comprising a fired high silica composition having in excess of 90% by weight $SiO_2$, said slab being self-supporting as formed in a thickness greater than about 2 cm;
   b) a compatible, fired-glaze surface coating on surfaces of said slab that are visibly exposed in said installation, said glaze being provided on said visibly exposed surfaces and intermediate joining edges to provide continuity; and
   c) said glaze being selected for color, luster and texture.

12. A custom monolithic surface product as in claim 11 wherein said fired-glaze surface coating includes a surface treatment selected from a textured leather-like or flamed iridescent appearance.

13. A custom monolithic surface product as in claim 11 wherein said fired-glaze surface exhibits pull-back or drip on selected edges or surface as a decorative element.

14. A custom monolithic surface product as in claim 11 wherein said fired-glaze surface is selected from at least one of metallic, crazed, crystalline, gloss, matte, semi-gloss, eggshell, orange-peel, and satin looks.

15. A custom monolithic surface product as in claim 11 which includes an intermediate engobe layer between said base slab and said glaze layer in at least selected areas of said surface product.

16. A custom monolithic surface product as in claim 11 wherein said fired-glaze surface coating includes a design.

17. A custom monolithic surface product as in claim 16 wherein said design comprises a plurality of glaze compositions selected from at least two different colors.

18. A custom monolithic surface product as in claim 11 which includes a second layer of glaze over said glaze layer.

19. A custom monolithic surface product as in claim 11 wherein said base slab material includes less than about 3% by weight moisture and less than about 1% by weight of an organic binder.

20. A custom monolithic surface product as in claim 19 wherein said $SiO_2$ is crushed crystalline quartz material having less than about 2% by weight natural impurities, a particulate size ranging from about +50 (grit) to −20 (particles) USS mesh, and includes additives selected from at least one of less than 3% by weight $Al_2O_3$ as a binder, less than about 1% by weight $ZrO_2$ as a flux, a colorant, and kaolinite up to 10% by weight.

* * * * *